United States Patent [19]

Hamaguchi et al.

[11] Patent Number: 5,239,421
[45] Date of Patent: Aug. 24, 1993

[54] VIDEO SIGNAL PROCESSING METHOD AND APPARATUS WITH TIMEBASE DISTURBANCE CORRECTION AND DROPOUT COMPENSATION

[75] Inventors: Masakazu Hamaguchi, Yokohama; Takashi Furuhata, Kamakura; Hiroaki Takahashi, Yokohama, all of Japan

[73] Assignee: Hitachi, Ltd., Tokyo, Japan

[21] Appl. No.: 688,284

[22] Filed: Apr. 22, 1991

[30] Foreign Application Priority Data

Apr. 20, 1990 [JP] Japan ................................ 2-102942

[51] Int. Cl.$^5$ .............................................. H04N 5/78
[52] U.S. Cl. .................................. 360/38.1; 360/11.1; 358/336
[58] Field of Search ............... 360/38.1, 11.1, 33.1, 360/36.1; 358/314, 336

[56] References Cited

U.S. PATENT DOCUMENTS

| | | | |
|---|---|---|---|
| 4,199,780 | 4/1980 | Taylor | 360/38.1 X |
| 4,224,642 | 9/1980 | Mawatari et al. | 360/38.1 X |
| 4,287,529 | 9/1981 | Tatani et al. | 360/36.2 X |
| 4,561,083 | 12/1985 | Nishikawa et al. | 360/38.1 X |
| 4,733,312 | 3/1988 | Morimoto | 360/38.1 X |
| 4,805,040 | 2/1989 | Oku et al. | 360/38.1 X |
| 4,891,699 | 1/1990 | Hamada et al. | 360/38.1 X |
| 5,067,031 | 11/1991 | Yamasaki et al. | 360/33.1 X |

*Primary Examiner*—Andrew L. Sniezek
*Attorney, Agent, or Firm*—Antonelli, Terry, Stout & Kraus

[57] ABSTRACT

A method of reproducing video signals from a magnetic recording medium like a magnetic tape for a VTR to obtain high-quality video pictures even when dropouts occur in the medium, which includes the steps of separating synchronizing information from the video signals reproduced from the magnetic recording medium, detecting a dropout duration from the reproduced video signals, generating complete synchronizing information during a whole period of writing the signals in image information memories by compensating lost synchronizing information during the dropout, generating write address signals on the basis of the generated synchronizing information, writing reproduced video signals the memories on the basis of the generated write address signals while no dropout occurs, and leaving unchanged previously written video signals while a dropout occurs. According to an apparatus implementing the above method, reproduced pictures of high quality are obtained without jitters and skews due to dropouts.

10 Claims, 13 Drawing Sheets

VIDEO SIGNAL PROCESSING METHOD AND APPARATUS WITH TIMEBASE DISTURBANCE CORRECTION AND DROPOUT COMPENSATION

BACKGROUND OF THE INVENTION

1. Field of the Invention

This invention relates to a magnetic recording and reproducing method and apparatus such as a VTR, and particularly to a video signal processing method and apparatus for correcting the disturbance of the timebase of a video signal and compensating the video signal for a lost part of the video signal due to dropout or the like, so as to stably achieve a good reproduced picture.

2. Description of the Related Art

When an image is reproduced on a magnetic recording and reproducing apparatus such as a VTR, a change of the position of a signal detecting medium such as a magnetic head relative to a recording medium such as a magnetic tape from the position thereof upon recording will cause the timebase of the reproduced video signal to vary. In this case, a small change of the timebase will cause a jitter in the reproduced picture, while a large change thereof will cause a skew, thus greatly affecting the stability of the reproduced picture.

Moreover, if the recording medium is scratched or soiled with dirt, the reproduced radio frequency (RF) signal is partially lost or reduced (or a so-called dropout is caused), thus considerably deteriorating the quality of the reproduced picture.

A method for solving the above problem is described, for example, in the paper "VTR Technology", chapter 6, pp. 107–133, in Vol. 5 of the Broadcasting Technology Series published by Nippon Hoso Publishing Association, May 1983, and employs a video signal processing apparatus comprising a timebase disturbance compensation circuit and a dropout compensation circuit as shown in FIG. 2. FIG. 2 is a block diagram of a conventional video signal processing apparatus.

Referring to FIG. 2, there are shown an input terminal 10 to which a video signal having a timebase disturbance is applied, an output terminal 20 at which a video signal corrected for the timebase disturbance and compensated for dropout is produced, and an input terminal 30 to which is applied a dropout signal indicating a dropout period in which the amplitude of the reproduced radio frequency (RF) signal is found to be considerably reduced when the envelope thereof is detected in the FM system of the VTR. In addition, there are shown an A/D converter circuit 1 for converting an input video signal into a digital signal, a video signal processing main memory 2 which is formed of a RAM or the like and functions as a timebase disturbance correcting buffer memory, and a dropout signal memory 3 formed of a RAM or the like. Shown at 7 is a horizontal synchronizing signal separation circuit. The horizontal synchronizing signal which has a timebase disturbance and is extracted from this horizontal synchronizing separation circuit 7 is supplied to a write clock generating circuit 50 and then to a write address control circuit 60.

The write clock generating circuit 50 generates a write clock pulse in synchronism with the horizontal synchronizing signal so as to coincide in timing with the input video signal having a timebase disturbance, or variation which is applied to the terminal 10. The write address control circuit 60 generates a write address based on the write clock pulse.

Thus, the video signal having a timebase variation from the terminal 10 is sequentially converted to a digital signal in synchronism with the write clock pulse by the A/D converter circuit 1, and then written in the video signal processing main memory 2 in accordance with the write address. Thus, since the video signal at a position corresponding to the clock pulse generated in synchronism with the horizontal synchronizing signal is sequentially recorded in a proper address of the main memory 2, the timebase disturbance, or variation of the recorded video signal can be corrected. At the same time, the dropout signal applied to the terminal 30 is written in the dropout signal memory 3 at the write address in synchronism with the video signal.

On the other hand, a stable reference synchronizing signal with no timebase variation is supplied via a terminal 40 to a read clock generating circuit 80, which then generates a read clock pulse in synchronism with the reference synchronizing signal. A read address control circuit 70 produces a read address in synchronism with this read clock pulse.

The video signal data stored in the video signal processing memory 2 is sequentially read from the read address at each horizontal scanning period, and supplied to a switching circuit 4. The dropout signal stored in the dropout signal memory 3 is read from the read address in synchronism with the video signal data. The switching circuit 4 is operated by the dropout signal read from the dropout signal memory 3 so as to select the output from a 1 H delay circuit 5 (H is the horizontal scanning period) during the dropout period and to select the output from the video signal processing main memory 2 during the other period. The 1 H delay circuit 5 is formed of a line memory or the like, and responds to the read clock pulse to delay the video signal data from the switching circuit 4 by 1 H. Therefore, when there is no dropout, or in a normal state, the same video signal as the contents of the video signal processing main memory 2 is produced from the 1 H delay circuit 5. When there is a dropout, the video signal data 1 H before is produced instead of the video signal having the dropout, or the video signal compensated for the dropout is produced from the 1 H delay circuit 5.

The video signal data produced from the 1 H delay circuit is supplied to a D/A converter circuit 6 where it is sequentially converted to an analog signal in synchronism with the read clock pulse. As a result, the video signal corrected for the timebase variation and compensated for the dropout is produced at a terminal 20.

The write clock generating circuit 50, as described in the above cited literature, is conventionally formed of an AFC (automatic frequency control) circuit operating on the basis of the horizontal synchronizing signal.

There is known a clock generating circuit formed of an APC (automatic phase control) circuit using the so-called burst signal included in the horizontal blanking period. In addition, there is also known a method of generating a write clock synchronized with the input video signal by use of the AFC circuit based on the horizontal synchronizing signal and the APC circuit based on an input video signal.

In the above prior art, the timebase variation is corrected by the video signal processing main memory 2 and so on, and the dropout is compensated for by the dropout signal memory 3, the 1 H delay circuit 5 (line memory) and so on independently from the timebase variation correction. Thus, the signal processing is complicated and hence needs a large-scale circuit arrangement.

When a dropout occurs so that a part of the video signal is lost, the dropout correction and the timebase variation compensation are made as described above, but a problem still remains as will be described below.

FIG. 3 shows the operation of the conventional video signal processing apparatus. As illustrated in FIG. 3, when a dropout including a synchronizing information part occurs, the video signal with a part lost by the dropout as indicated by DOC is compensated for the part by the application of the 1 H-before-video signal based on the dropout detecting signal as mentioned above. A part of the first line of the video signal which is not lost by the dropout and a faultless part of the third line and the following lines of the video signal (indicated by TBC in FIG. 3) are corrected for the time-base variations of the lines on the basis of the horizontal synchronizing signal HS1, HS3, ... at the head of each line. However, since the horizontal synchronizing signal HS2 at the beginning of the second line is lost by the dropout, a write clock pulse precisely following the timebase variation of the horizontal synchronizing signal HS2 cannot be generated for the second line (indicated by NO-TBC) a part of which is not lost by the dropout. Thus, the timebase correction cannot be completely performed. This follows that the reproduced image within this line (indicated by NO-TBC) appears shifted in the horizontal direction on the screen, or that the reproduced picture quality is deteriorated.

Also, even when only the horizontal synchronizing signal HS2 at the head of the second line is lost by the dropout as illustrated in FIG. 4 which shows another operation of the conventional video signal processing apparatus or even when the horizontal synchronizing signal HS2 is not correctly separated, not due to the dropout, but due to a noise entering into the video signal as illustrated in FIG. 5 which shows still another operation of the conventional video signal processing apparatus (as indicated by NO-TBC in FIGS. 4 and 5), the reproduced picture quality is similarly deteriorated. Thus, the prior art has the drawback that when a part of the video signal is lost due to a dropout or other causes, no consideration is made for the necessary video signal processing on the lack of the horizontal synchronizing signal or burst signal which becomes the reference for the correction of the timebase variation, resulting in the deterioration of the reproduced picture quality.

SUMMARY OF THE INVENTION

Accordingly, it is an object of the invention to provide a video signal processing method and apparatus with no drawback of the prior art, or capable of proper timebase variation correction and dropout compensation to stably produce a good reproduced picture with no quality deterioration by a small-scale circuit arrangement and simple signal processing.

In order to achieve the above object, according to this invention, there is provided a video signal writing method for writing an input video signal including image information and synchronizing information in video signal processing memories, in a magnetic recording and reproducing apparatus, comprising the steps of:

separating the synchronizing information from the input video signal;

detecting a dropout in the input video signal and generating a dropout detected signal corresponding to a part at which the dropout occurs;

generating a write disable signal or masking a write enable signal for the video signal processing memories in accordance with the dropout detected signal;

compensating for the part including the dropout on the basis of the synchronizing information, thereby generating full synchronizing information over all periods;

generating a write address signal to the video signal processing memories in accordance with the generated synchronizing information;

writing new image information at an address specified by the write address signal in the video signal processing memories when there is not the write disable signal; and holding the image information recorded at the address specified by the write address signal in the video signal processing memories when there is the write disable signal.

Particularly, in this video signal writing method, the step for generating the write disable signal generates a write disable signal including the period in which the dropout detected signal exists and covering up to the synchronizing information separated from the input video signal.

Moreover, in order to achieve the above object of the invention, according to this invention, there is provided a video signal processing apparatus having video signal processing memories for writing therein an input video signal formed of synchronizing information and image information, in a magnetic recording and reproducing apparatus, comprising:

a synchronizing information separation circuit for separating synchronizing information from the input video signal;

a first clock generating circuit for generating a first clock of a predetermined frequency synchronized with the input video signal on the basis of the synchronizing information separated by the synchronizing information separation circuit;

a dropout detecting circuit for generating a dropout detected signal during the time in which a dropout occurs in the input video signal;

a write control circuit for generating a write address signal over all periods including a dropout period on the basis of the first clock and the separated synchronizing information, and generating a write disable signal on the basis of the dropout signal; and image information memories for writing the image information separated from the input video signal at an address specified by the write address signal when there is not the write disable signal, and holding the recorded image information when there is the write disable signal.

Particularly, the write disable signal generated from the write control circuit includes the duration of the dropout detected signal and covers up to the separated synchronizing information.

According to this invention, even when an input video signal has a timebase variation, a clock synchronized with the timebase variation is generated on the base of the synchronizing information separated from the input video signal, the input video signal is converted from analog to digital signal on the basis of this clock, and a write address signal over the whole picture is generated with the lost synchronizing signal being compensated for on the basis of the synchronizing information including this clock and the vertical and horizontal synchronizing signals. This write address signal is used to specify the address to the video signal processing memories. Therefore, even if a variation is caused by the relative shift between the recording medium such as a magnetic tape and the signal detecting medium such as a magnetic head, the video signal is timely converted from analog to digital signal and written at the specified address.

Moreover, when the dropout detected signal is produced, the write disable signal is generated or a write enable signal is masked to prevent the separated image information from being written in the video signal processing memories, and to hold the previously recorded information corresponding to this dropout period. Thus, in the dropout period, a one-field-before part or a one-frame-before part of the video signal is again reproduced. Since the one-field-before part or other part of the video signal is almost not different from the current part, the picture quality of the reproduced picture is not so deteriorated.

In addition, according to this invention in which when the synchronizing information is lost by a dropout, the write disable signal is continued until the next synchronizing information comes, all the image information during one horizontal scanning period is replaced by the previous one, and thus it is prevented that the timebase is changed by the loss of synchronizing information for new image information to cause mismatch in the boundary between the previous image information and the new image information. Thus, the picture quality of the reproduced picture is further improved.

Accordingly, the video signal processing method and apparatus of the invention can make both the timebase variation correction and the dropout compensation in a single memory system, thus enabling the signal processing to be simplified and the circuit scale to be reduced.

DESCRIPTION OF THE PREFERRED EMBODIMENTS

Figure 1:
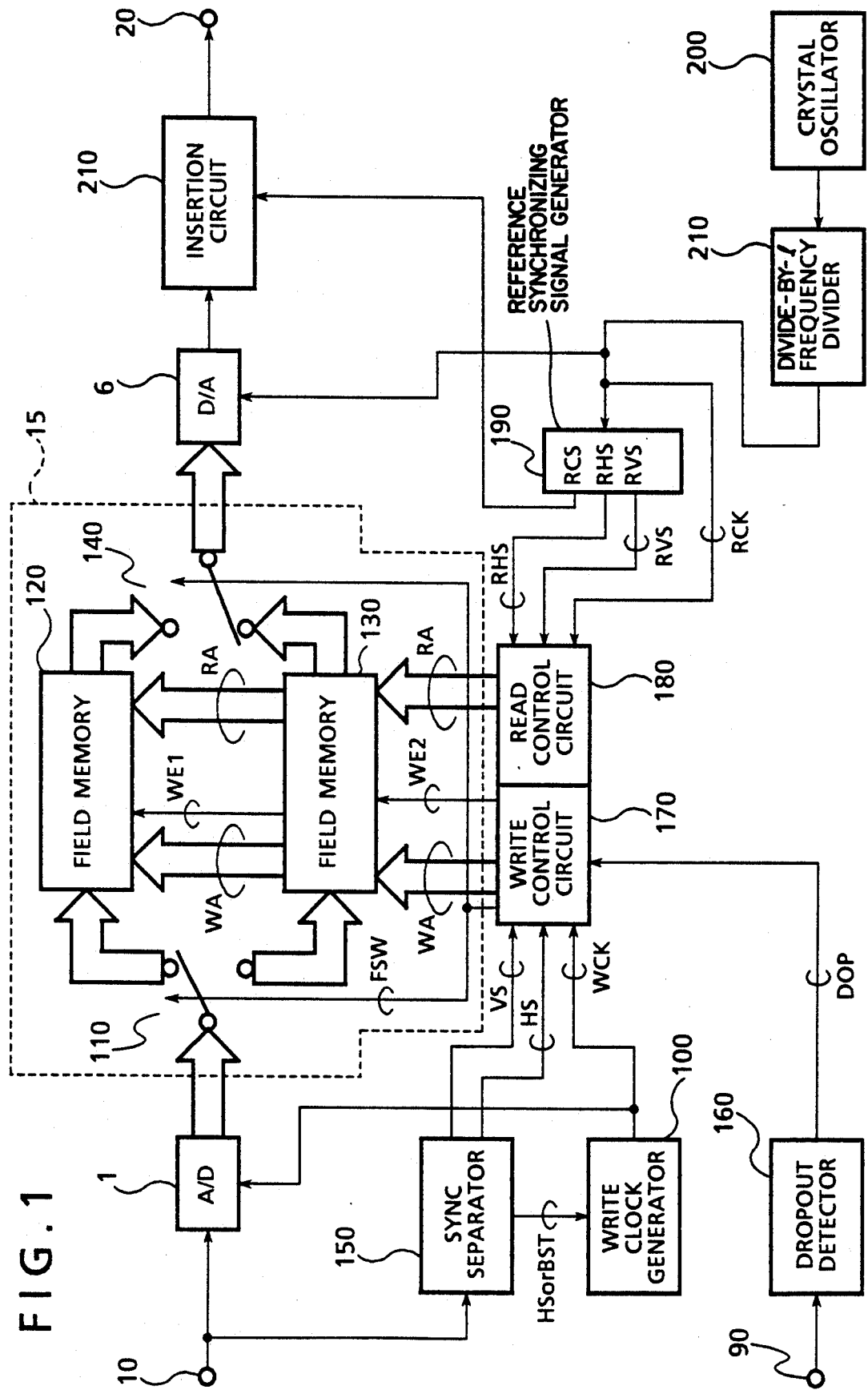
FIG. 1 is a block diagram of one embodiment of a video signal processing method and apparatus of the invention.
Figure 2:
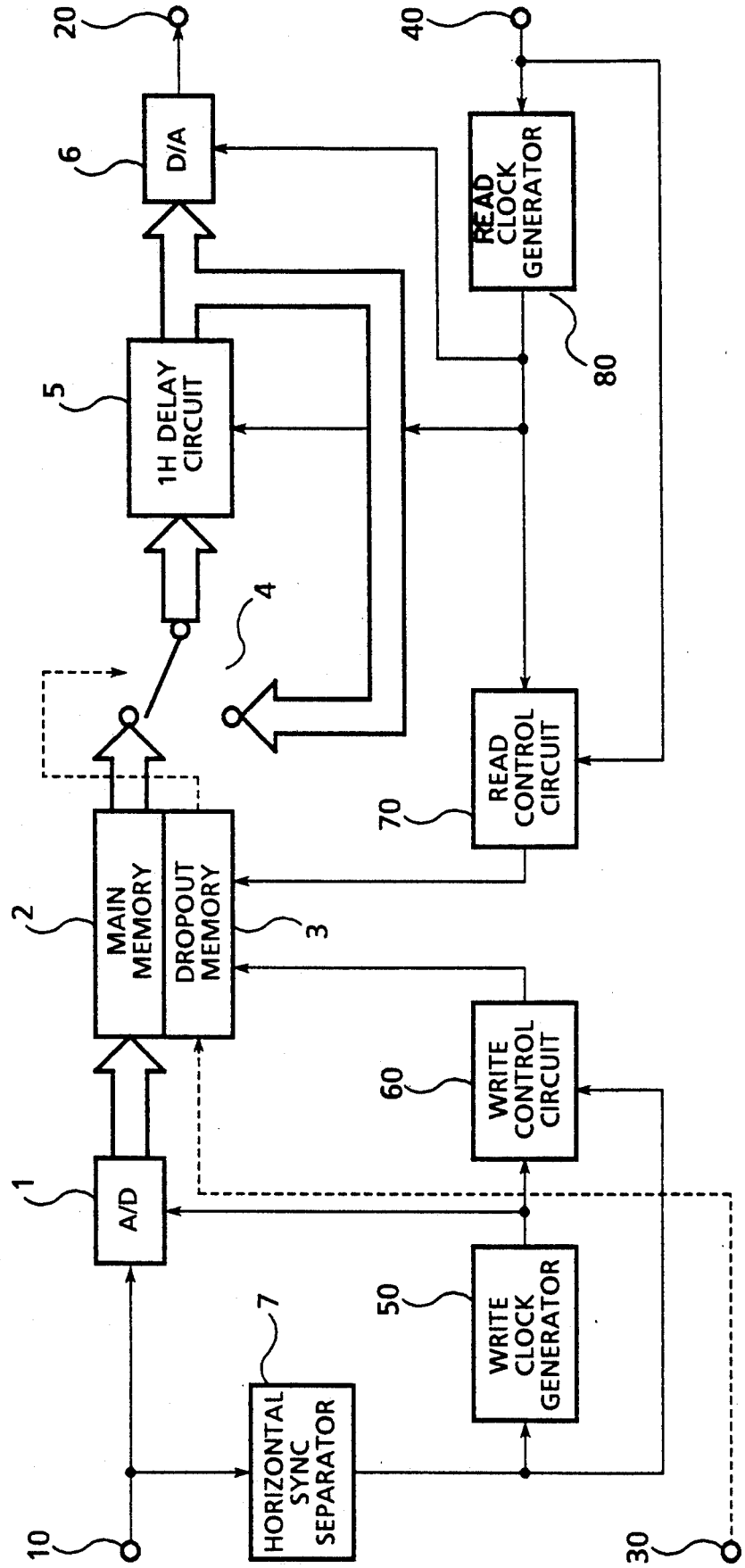
FIG. 2 is a block diagram of a conventional video signal processing apparatus.
Figure 3:
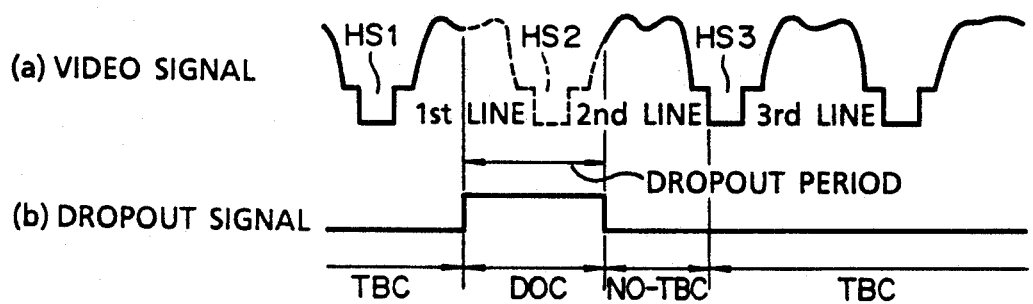
FIGS. 3, 4 and 5 are waveform diagrams to which reference is made in explaining the operation of the conventional video signal processing apparatus shown in FIG. 2.

FIG. 1 is a block diagram of one embodiment of a video signal processing method and apparatus of the invention. The A/D converter circuit 1 and the D/A converter circuit 6 in FIG. 1 are the same as in the conventional one in FIG. 2, and thus are represented by the same reference numerals as those in FIG. 2.

A video signal having a timebase variation is supplied via the terminal 10 to the A/D converter circuit 1 and a synchronizing information separating circuit or a sync separator 150. The sync separator 150 separates a vertical synchronizing signal VS, a horizontal synchronizing signal HS and a burst signal BST superimposed in the horizontal blanking period from the input video signal and produces them. A write clock generating circuit or a write clock generator 100 generates a write clock WCK (frequency fw) to coincide in timing with the input video signal having a timebase variation on the basis of the separated horizontal synchronizing signal HS or burst signal BST in the same manner as for example in the prior art. Thus, the video signal having a timebase variation supplied via the terminal 10 is sequentially converted from the analog to digital signal in synchronism with the write clock WCK from the write clock generator 100. The video signal data of digital signal from the A/D converter circuit 1 is supplied through a switching circuit 110 to field memories 120 and 130.

On the other hand, a reproduced radio-frequency (RF) signal reproduced from a magnetic tape by a magnetic head and fed through a terminal 90 is supplied to a dropout detecting circuit, or a dropout detector 160. The dropout detector 160 detects, for example, the envelope of the reproduced radio frequency (RF) signal, discriminates that the amplitude has lowered to a predetermined level or below, and produces a dropout signal DOP.

The dropout signal DOP produced from the dropout detector 160 is supplied to a write control circuit 170. In addition, to the write control circuit 170 are supplied the vertical synchronizing signal VS and horizontal synchronizing signal HS separately produced from the sync separator 150, and the write clock WCK generated from the write clock generator 100. The write control circuit 170 responds to these input signals to generate signals for controlling the write operation of the field memories 120 and 130. The field memories 120 and 130 are controlled by the control signals from the write control circuit 170 so as to generally operate as follows.

The write control circuit 170 generates a switching signal FSW for controlling the switching operation of the switching circuit 110. This switching signal FSW is reversed in its polarity during the vertical blanking period VBLK of the input video signal (FIG. 6(a)) fed through the terminal 10. The switching circuit 110 is changed alternately between the positions for either field by this switching signal FSW, so that the video signal data from the A/D converter circuit 1 is switched to the field memories 120 and 130, alternately at every field as shown in FIGS. 6(c) and (d).

Moreover, the write control circuit 170 produces write enable signals WE1, WE2 for alternately writing the video signal data (see FIGS. 6(c) and (d)) in the field memories 120 and 130, respectively. The write enable signals WE1 and WE2 are alternately turned "H" level only during the effective line period of the video signal data (see FIGS. 6(c) and (d)) fed to each field memory as shown in FIGS. 6(e) and (f). When the write enable signals are inverted in sign, they turn to write disable signals. The field memories 120 and 130 are brought into the writing mode when the write enable signals WE1 and WE2 are "H" level or when the write disable signals are "low" level. Thus, the image information data of the video signal data (FIGS. 6(c) and (d)) except the vertical and horizontal blanking periods is written at the timing shown in FIGS. 6(g) and (h) in the field memories 120 and 130 over a predetermined region in which data of each line is to be entered in accordance with the write address signal WA which will be mentioned below. Thus, at this time, the timebase variation of the video signal fed via the terminal 10 is substantially corrected.

Figure 7:
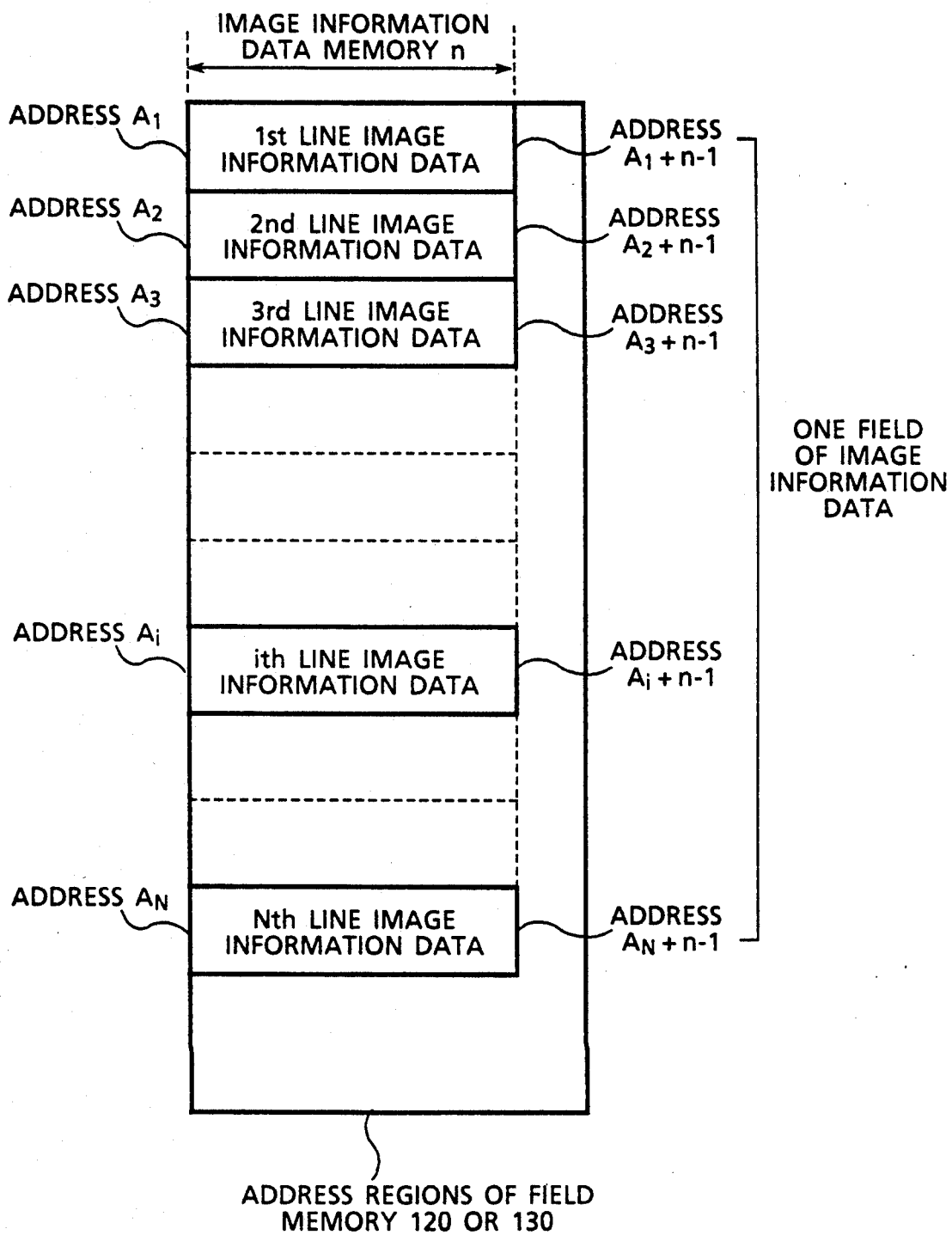
FIG. 7 is a schematic diagram of one example of the address regions of the field memory used in the embodiment shown in FIG. 1.

The write address signal WA is produced from the write control circuit 170 in such a manner that it is reset to a start address at every field by the vertical synchronizing signal VS and reset to a certain start address at every H by the horizontal synchronizing signal HS so as to surely coincide one to one with the image information data of each field unit fed to the field memories 120 and 130. Therefore, the image information data of one field is stored in the same address region at every field as for example shown in a specific example of FIG. 7. The address regions of the field memory 120 or 130 are illustrated in FIG. 7. Assigned from the image information data of one field, the first line data is bounded to be stored in the region from address A1 to (A1+n−1), and the i th line data is to be stored in the region from Ai to (Ai+n−1), where n (an integer larger than 1) is the number of image information data within 1 H.

It will be understood from the above description that the video signal data from the A/D converter circuit 1 is written field by field in the field memories 120 and 130 alternately at a predetermined region in accordance with the write control signal, so that the timebase variation correction is performed. The write control signal (a switching signal FSW, write enable signals WE1 and WE2, and a write address signal WA) is actually generated as follows.

Figure 8:
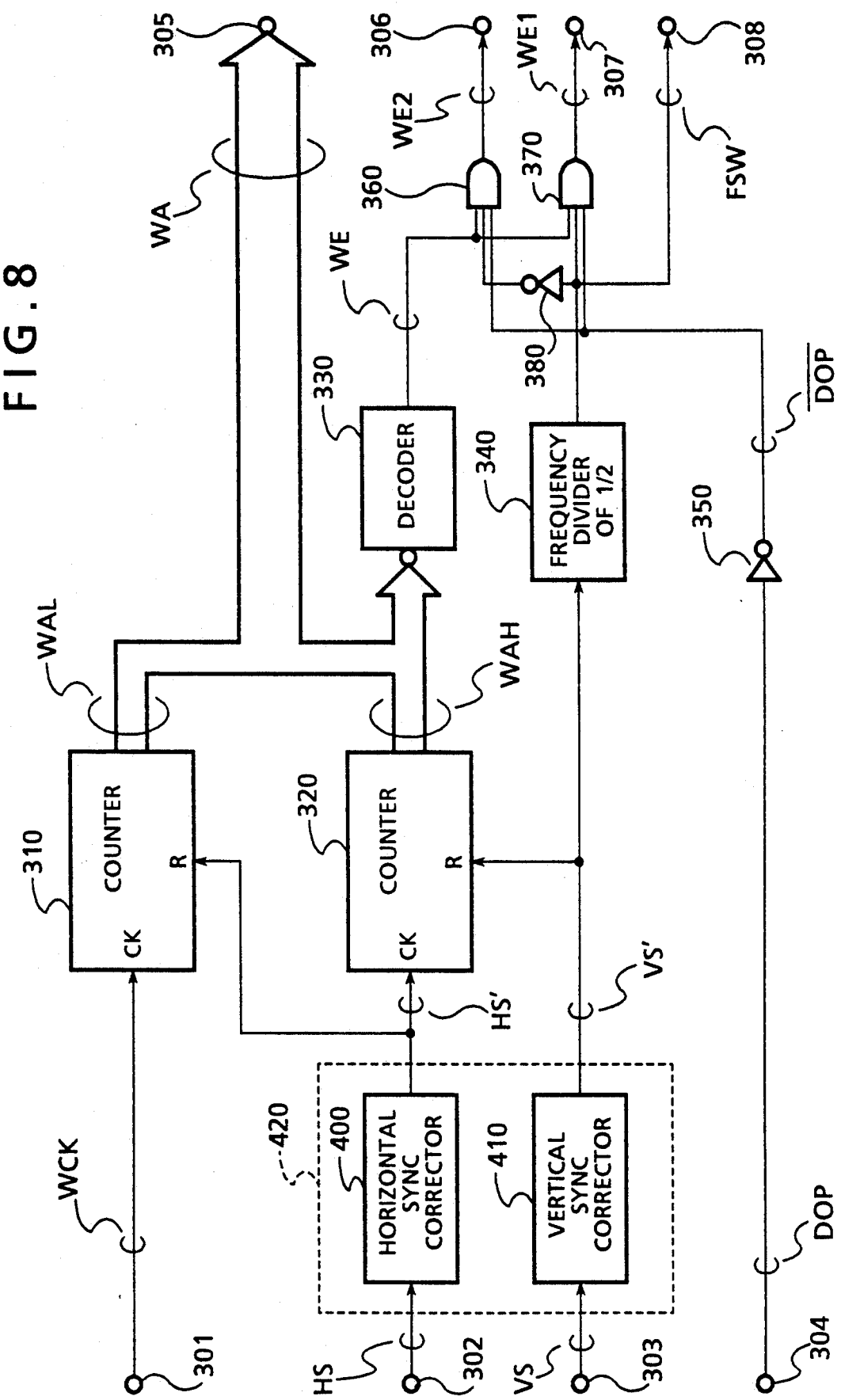
FIG. 8 is a block diagram of one example of the write control circuit in the embodiment of FIG. 1.

FIG. 8 is a block diagram of a specific example of the write control circuit 170 shown in FIG. 1.

Referring to FIG. 8, there are shown an input terminal 301 to which the write clock WCK is applied, an input terminal 302 to which the horizontal synchronizing signal is applied, an input terminal 303 to which the vertical synchronizing signal VS is applied, and an input terminal 304 to which the dropout signal DOP is applied.

Figure 9:
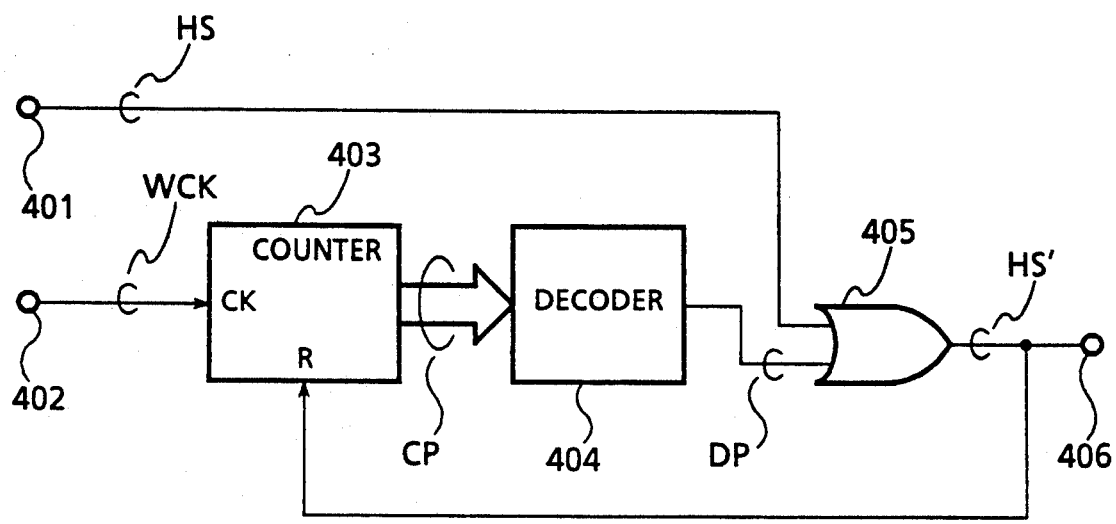
FIG. 9 is a block diagram of one example of the horizontal synchronizing correction circuit in the write control circuit of FIG. 8.

The horizontal synchronizing signal HS is fed via the terminal 302 to a horizontal synchronizing signal correction circuit or a horizontal sync corrector 400 in a sync corrector 420. The horizontal sync corrector 400 corrects the horizontal synchronizing signal HS for the lost part due to a dropout or other causes and produces a corrected horizontal synchronizing signal HS'. FIG. 9 shows one example of this horizontal synchronizing signal correction circuit 400, and FIG. 10 shows a waveform diagram to which reference is made in explaining the operation thereof.

Figure 10:
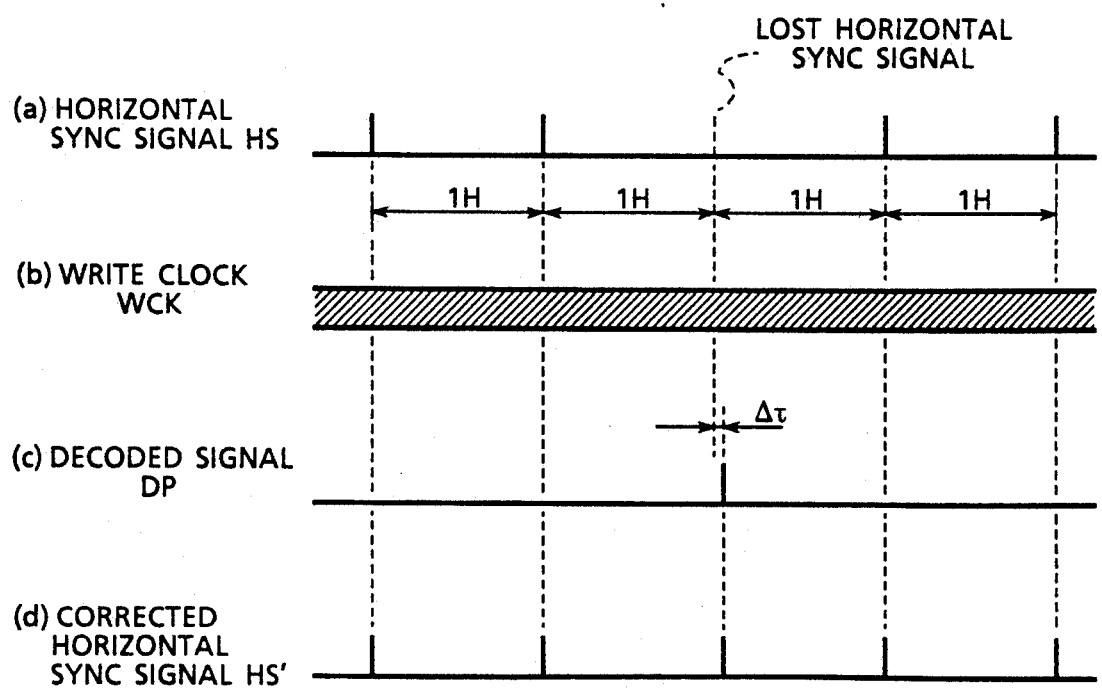
FIG. 10 is a waveform diagram to which reference is made in explaining the operation of the horizontal synchronizing correction circuit of FIG. 9.

Referring to FIG. 9, the horizontal synchronizing signal HS (indicated in FIG. 10(a)) is supplied via a terminal 401 to an OR circuit 405, and the write clock WCK (indicated in FIG. 10(b)) is supplied via a terminal 402 to a clock terminal CK of a counter 403. To the reset terminal R of the counter 403 is supplied the corrected horizontal synchronizing signal HS' (indicated in FIG. 10(d)) which, as described later, is a logical sum of the horizontal synchronizing signal HS and a decoded signal DP (FIG. 10(c)). Thus, the counter 403 is initialized at every H by the corrected horizontal synchronizing signal HS', and then counts the write clock WCK. A decoder 404 is supplied with the count output CP from the counter 403, and when the count output CP reaches a certain value relating to the 1 H period, the decoder 404 produces the decoded signal DP (illustrated in FIG. 10(c)). The decoder 404 is set to a decode value so as to produce the decoded signal DP when the counter has counted the number of clock pulses corresponding to the time of $1\,H + \Delta\tau (\Delta\tau << 1\,H)$. Therefore, as shown in FIG. 10, since when the horizontal synchronizing signal HS (FIG. 10(a)) is separated, the counter 403 is reset by the horizontal synchronizing signal HS at every H, the count output CP does not reach the set value of the decoder 404, and thus the decoded signal DP (FIG. 10(c)) is not produced. However, when the horizontal synchronizing signal HS is lost due to a dropout or other causes, the counter 403 is not reset by the horizontal synchronizing signal HS, and thus the decoded signal DP is produced $\Delta\tau$ after the lost horizontal synchronizing signal HS as shown in FIG. 10(c). The decoded signal DP is supplied to an OR circuit 405, where it is logically added to the horizontal synchronizing signal HS. Thus, even if the horizontal synchronizing signal HS is lost due to a dropout or other causes, the lost horizontal synchronizing signal is compensated for by the decoded signal DP which is produced at substantially the same time as the lost horizontal synchronizing signal, and thus the corrected horizontal synchronizing signal HS' is fed from the OR circuit 405 to a terminal 406.

Again turning to FIG. 8, the vertical synchronizing signal VS applied the terminal 303 is supplied to a vertical synchronizing signal correction circuit or a vertical sync corrector 410 in the sync corrector 420. When the vertical synchronizing signal VS is lost by a dropout or other causes, the vertical sync corrector 410 produces a corrected vertical synchronizing signal VS'. This vertical synchronizing signal correction circuit 410 can be realized to have the same construction as the horizontal sync corrector 400 shown in FIG. 9. In other words, the vertical synchronizing signal VS is supplied instead of the horizontal synchronizing signal HS, and the decoder 404 is set to the decode value so that when the counter 403 counts the number of clock pulses corresponding to the time of $1\,V + \Delta\tau$ (1 V is one vertical scanning period), the decoded signal DP is produced.

The corrected vertical synchronizing signal VS' produced as above is supplied to a divide-by-2 frequency dividing circuit or a frequency divider 340 and the reset terminal R of a counter 320. The frequency divider 340 divides the frequency of the corrected vertical synchronizing signal VS' by 2. The switching signal FSW is easily produced by dividing the frequency of the corrected vertical synchronizing signal VS' by 2, and thus the output from the divide-by-2 frequency divider 340 is supplied to a terminal 308 as the switching signal FSW.

To the clock terminal CK of the counter 320, the corrected horizontal synchronizing signal HS' is supplied in addition to the corrected vertical synchronizing signal VS'. The counter 320 is initialized by the corrected vertical synchronizing signal VS' at every field, and then counts the corrected horizontal synchronizing signal HS'. Thus, the count output WAH of the counter 320 is initialized by the corrected vertical synchronizing signal VS' at every field, and sequentially updated by the corrected horizontal synchronizing signal HS'.

On the other hand, the counter 310 is supplied at the reset terminal R with the corrected horizontal synchronizing signal HS' and at the clock terminal CK with the write clock WCK from the terminal 301. The counter 310 is initialized by the corrected horizontal synchronizing signal HS' at every H, and then counts the write clock WCK. Therefore, the output WAL of the counter 310 is initialized by the corrected horizontal synchronizing signal HS' at every H, and sequentially updated by the write clock WCK.

The write address signal WA is formed of the upper-order significant address or the count output WAH which is sequentially updated by the corrected horizontal synchronized signal HS', and the lower-order address or the count output WAL which is sequentially updated by the write clock WCK. That is, the count outputs WAH and WAL are fed to a terminal 305 as the address signal WA.

The write address signal WA generated in this way has the feature that the write start address can be reset at every field and at every H. Even if the vertical synchronizing signal VS or the horizontal synchronizing signal HS is lost due to a dropout or other causes, the lost synchronizing information is compensated for by the vertical synchronizing signal correction circuit 410 or the horizontal synchronizing signal correction circuit 400, and thus the write start address can be surely set at every field and at every H even during the dropout period. Thus, as described above, the image information data of each field unit supplied to the field memory 120 or 130 is certainly stored in the address regions with an exact one-to-one correspondence. More specifically, as shown in FIG. 7, surely the first line of the image information data of each field is stored in the region from address A1 to (A1+n−1), and the i th line of the image information data is stored in the region from address Ai to (Ai+n−1) in any case. Thus, when the image information data is read, a line is not missed out so that a shift is not caused in the reproduced picture.

Figure 6:
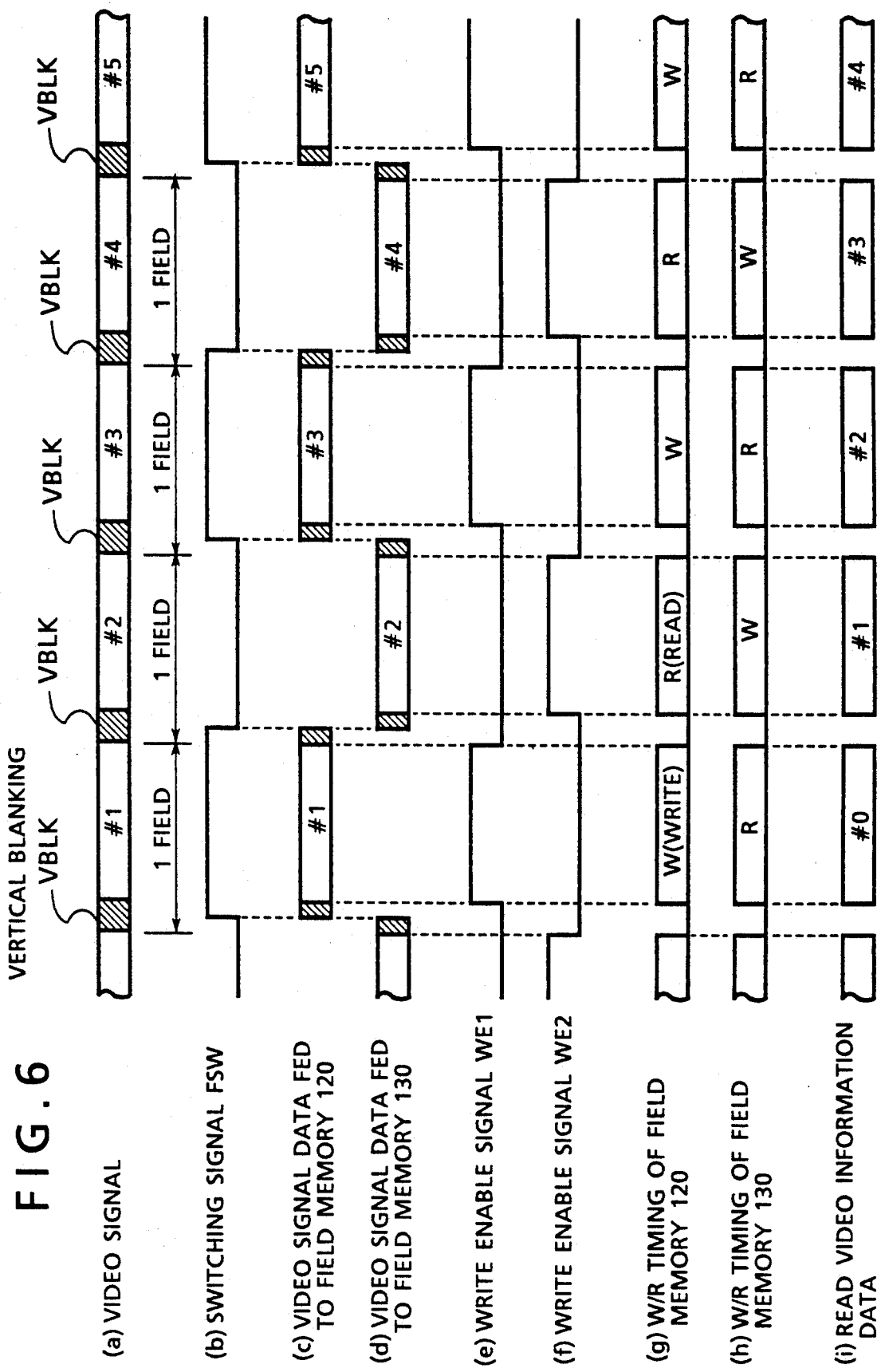
FIG. 6 is a waveform diagram to which reference is made in explaining the operation of the embodiment shown in FIG. 1.

The generation of the write enable signal and the switching signal will be described with reference to FIGS. 6, 8 and 11.

The count output WAH is supplied to the decoder 330. The decoder 330 decodes the count output WAH which is sequentially updated by the corrected horizontal synchronizing signal HS', and produces the decoded signal WE (FIG. 11(b)) which becomes "H" level during the effective lines of each field. This decoded signal WE is supplied to AND circuits 360 and 370. The AND circuit 370 is also supplied with an inverted dropout signal $\overline{DOP}$ (FIG. 11(c)) which is supplied via the terminal 304 and an inverter 350 and with the switching signal FSW (FIG. 11(d)). The AND circuit 360 is also supplied with the inverted dropout signal $\overline{DOP}$ and the inverted switching signal $\overline{FSW}$ (FIG. 11(e)) into which the switching signal FSW is inverted by an inverter 380.

Figure 11:
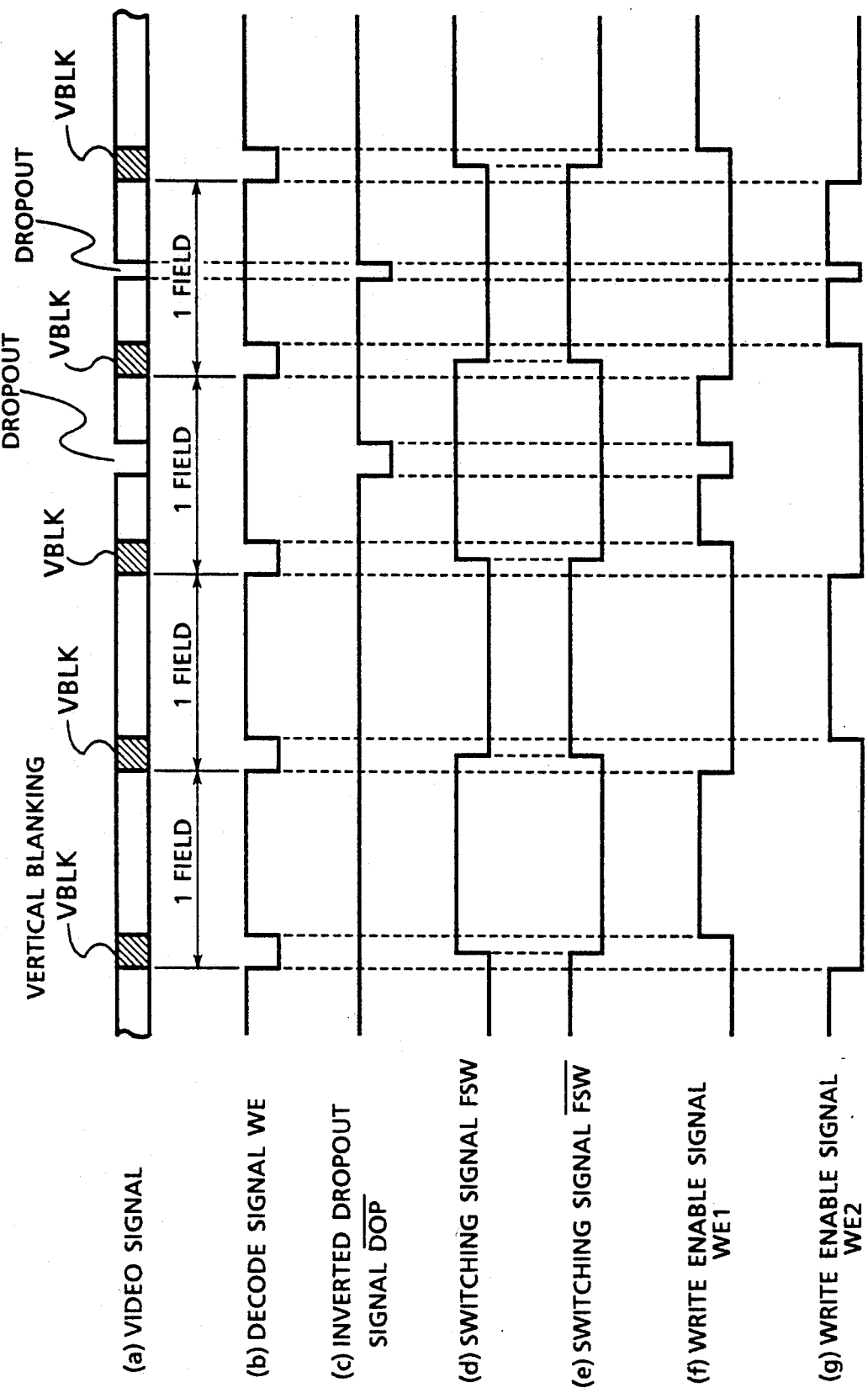
FIG. 11 is a waveform diagram to which reference is made in explaining the operation of the write control circuit of FIG. 8.

Therefore, when no dropout occurs or when the inverted dropout signal $\overline{DOP}$ is "H" level, the AND circuit 370 produces the write enable WE1 (FIG. 6(e)) or FIG. 11(f)) as a result of gating on the decoded signal WE (FIG. 11(b)) by the switching signal FSW (FIG. 11(d)) as shown in FIG. 11. This write enable signal WE1 is fed to a terminal 307. The AND circuit 360 produces the write enable signal WE2 (FIG. 6(f), FIG. 11(g)) as a result of gating on the decoded signal WE by the inverted switching signal $\overline{FSW}$ (FIG. 11(e)), and supplies it to a terminal 306. When a dropout occurs, the inverted dropout signal $\overline{DOP}$ is "L" level, and thus the write enable signals WE1 and WE2 are "L" level irrespective of the decoded signal WE, the switching signal FSW and the inverted switching signal $\overline{FSW}$.

Therefore, when a dropout occurs, the field memories 120 and 130 shown in FIG. 1 are controlled by the write enable signals WE1 and WE2, respectively so as not to write the image information data during the dropout period. Thus, the field memories 120 and 130 in which new image information data is not written during the dropout period hold the image information data written two fields before in the address regions. At this time, the image information data lost due to the dropout is substituted for by the image information data two fields before, the dropout thus being compensated for.

The controlling for reading the image information data written in the field memories 120 and 130 will be described below.

In FIG. 1, the reference clock (frequency f1) from the crystal oscillation circuit or crystal oscillator 200 is divided in frequency by 1 in a divide-by-1 frequency dividing circuit 210 (1 is an integer larger than 1). The divided output is supplied as a read clock RCK (frequency fR=f1/1) to a read control circuit 180, a reference synchronizing signal generating circuit 190 and the D/A converter circuit 6. The frequency fR of the read clock RCK is made equal to the frequency fW of the write clock WCK.

The reference synchronizing signal generating circuit 190 is formed of a counter and so on so that the read clock RCK is properly divided in frequency to produce a reference horizontal synchronizing signal RHS, a reference vertical synchronizing signal RVS and a reference composite synchronizing signal RCS which have the same format and frequency as the input video signal from the terminal 10.

Figure 12:
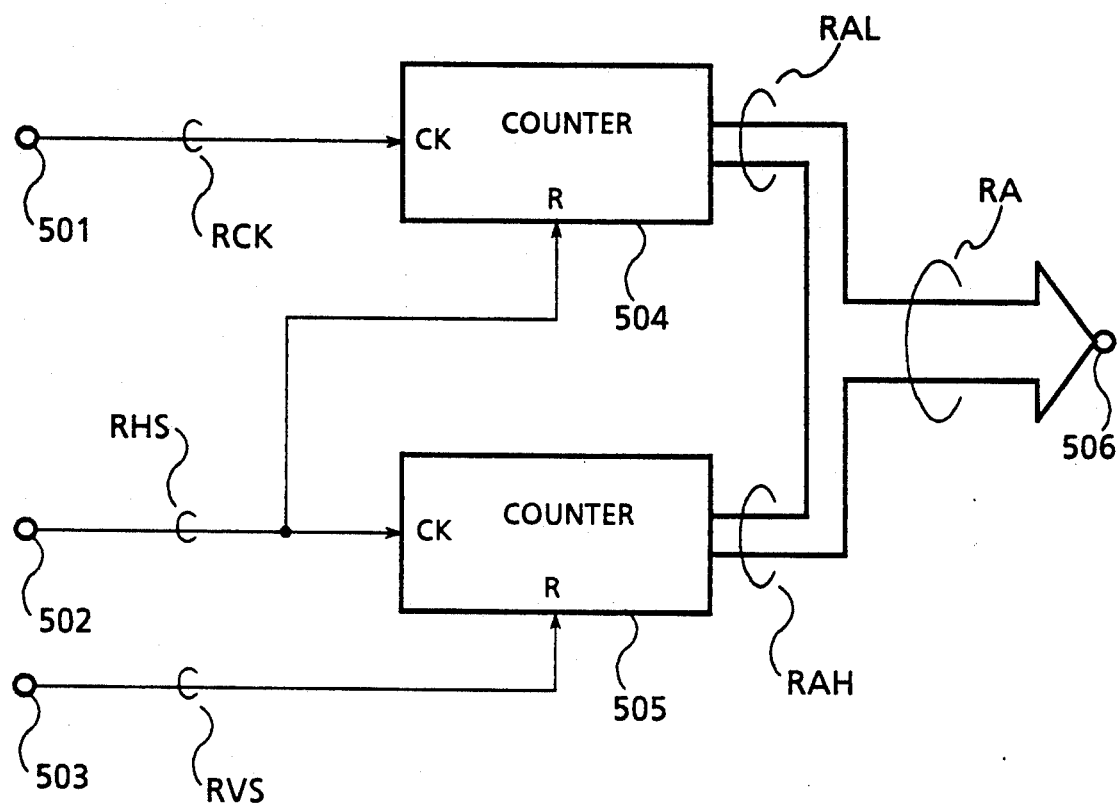
FIG. 12 is a block diagram of one example of the read control circuit in the embodiment of FIG. 1.

The read control circuit 180 is supplied with the reference horizontal synchronizing signal RHS, the reference vertical synchronizing signal RVS and the read clock RCK so as to produced a read address signal RA. FIG. 12 is a block diagram of a specific example of the read control circuit 180. In FIG. 12, the read clock from a terminal 501 is supplied to the clock terminal CK of a counter 504, the reference horizontal synchronizing signal RHS is supplied from a terminal 502 to the reset terminal R of the counter 504 and the clock terminal CK of a counter 505, and the reference vertical synchronizing signal RVS is supplied from a terminal 503 to the reset terminal R of the counter 505. The counter 504 is initialized by the reference horizontal synchronizing signal RHS at every H and then counts the read clock RCK. Therefore, the count output RAL of the counter 504 is initialized at every H by the reference horizontal synchronizing signal RHS and advanced by the read clock RCK, thus corresponding to the count output WAL of the counter 310 (FIG. 8) in the write control circuit 170. The counter 505 is initialized at every field by the reference vertical synchronizing signal RVS, and then counts the reference horizontal synchronizing signal RHS. Therefore, the count output RAH of the counter 505 is initialized at every field by the reference vertical synchronizing signal RVS and advanced by the reference horizontal synchronizing signal RHS, thus corresponding to the count output WAH of the counter 320 (FIG. 8) in the write control circuit 170.

The read address signal RA is formed of the count output RAH which is sequentially advanced by the reference horizontal synchronizing signal RHS, as an upper part of the address signal, and the count output RAL which is sequentially advanced by the read clock RCK, as a lower part of the address signal. The count outputs RAH and RAL are fed to the terminal 506 as the read address signal RA, and supplied to the field memories 120 and 130 shown in FIG. 1.

The field memories 120 and 130 sequentially read the image information data at the timing shown in FIGS. 6(g) and 6(h) from the address according to the read address signal RA when the write enable signals WE1 and WE2 are "L" level. Therefore, the field memories 120 and 130 repeat alternate writing and reading of image information data. In this way, the image information data is read from the alternate field memories 120 and 130 at every field unit.

The image information data read from the field memories 120 and 130 alternately is supplied through a switching circuit 140 to the D/A converter circuit 6. The switching circuit 140 is changed in the position at every field by the switching signal FSW generated from the write control circuit 6, so that the image information data read at every field from the alternate field memories 120 and 130 are serialized into a sequence of read image-information data as shown in FIG. 6(i). This sequence of read image information data is sequentially converted from the digital to analog signal by the D/A converter circuit 6 in synchronism with the read clock RCK. Since only the effective image portion except the horizontal and vertical blanking periods is stored in the field memories as image information data as described above, the output of the D/A converter circuit 6 does not include the horizontal and vertical blanking period signals. Thus, in order to restore the image information data to the same format as the input video signal from the terminal 10, the reference composite synchronizing signal RCS from the reference synchronizing signal generating circuit 190 is added to the output from the D/A converter circuit 6 by an insertion circuit 210 and fed to the terminal 20.

As a result, at the output terminal appears a video signal with no timebase variation and with the lost part of information due to a dropout being compensated for by the two-field-before part of the video signal.

As will be understood from the above description, the video signal processing apparatus shown in FIG. 1 can simultaneously make the timebase variation correction and the dropout compensation in the single memory system of the field memories 120 and 130, and thus circuit scale reduction and simple signal processing can be realized.

Moreover, in the above embodiment, since the frequency fW of the write clock WCK and the frequency fR of the read clock RCK is the same, only the timebase variation of the input video signal is removed, and thus no compression and expansion of the timebase is made between the writing and reading operations. This invention is not limited to the above construction, but can take such a construction in which the frequency fW of the write clock WCK is made different from the frequency fR of the read clock RCK, thereby adding the timebase varying function for the compression or expansion of the timebase of the input video signal in addition to the timebase variation removal.

Figure 13:
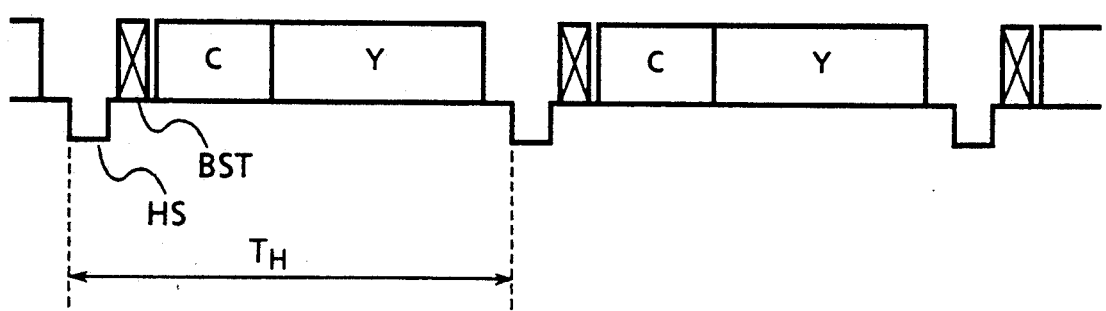
FIG. 13 is a waveform diagram showing another format of the video signal according to this invention.

In addition, this invention is not limited to the conventional video signal (for example, NTSC signal), but can be applied, without trouble, to the time-sharing video signal having the luminance component Y and chrominance component C and a set of horizontal synchronizing information (horizontal synchronizing signal HS and burst signal BST) in each horizontal scanning period as shown in FIG. 13.

Figure 14:
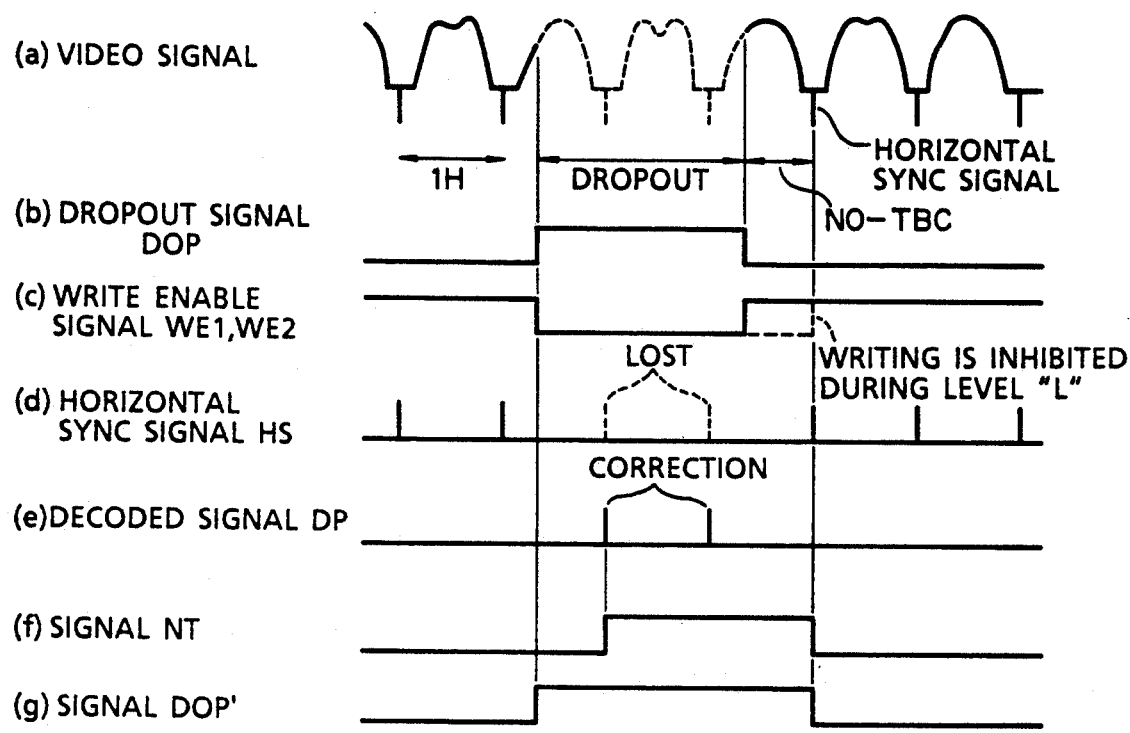
FIG. 14 is a waveform diagram showing another embodiment of a video signal processing apparatus of the invention.

Also, in the above embodiment, when a dropout occurs, the write enable signals WE1 and WE2 (FIG. 14(c)) are forcibly turned to "L" level by the dropout signal DOP (FIG. 14(b)), thus stopping the field memories 120 and 130 from writing, and the dropout compensation is made by the two-field-before part of the video signal, but the NO-TBC period of the video signal shown in FIG. 14(a), as described above, is not any more corrected for the timebase variation due to the lost of the reference horizontal synchronizing signal HS (or burst signal BST) for the timebase variation correction, with the result that the reproduced picture appears shifted in the horizontal direction, thus being deteriorated in its quality.

Figure 15:
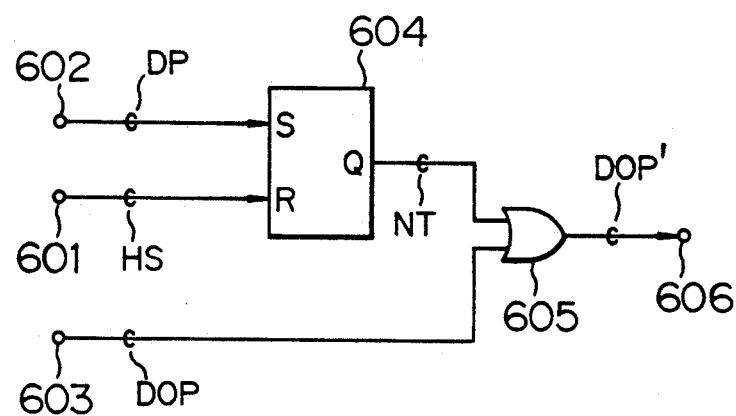
FIG. 15 is a block diagram of the dropout signal generating circuit for the embodiment of FIG. 14.

FIG. 15 is a block diagram of one example of the dropout signal generating circuit which performs an important role in reducing the above picture deterioration.

In FIG. 15, there are shown an input terminal 601 for the horizontal synchronizing signal HS produced from the sync separator 150 in FIG. 1, an input terminal 602 for the decoded signal DP produced from the decoder 404 in FIG. 9, an input terminal 603 for the dropout signal DOP produced from the dropout detector 160 in FIG. 1 and an output terminal 606 for a revised dropout signal DOP' which will be described later.

The horizontal synchronizing signal HS from the terminal 601 and the decoded signal DP from the terminal 602 are supplied to the reset terminal R and set terminal S of an RS flip-flop 604, respectively. As described above, the decoded signal DP (FIG. 14(e)) is produced to compensate for the lost horizontal synchronizing signal HS (FIG. 14(d)) due to a dropout or other causes. Thus, the RS flip-flop 604 is reset by the horizontal synchronizing signal HS when the horizontal synchronizing signal HS is correctly separated, but is set by the decoded signal DP for compensating for the lost horizontal synchronizing signal HS when the horizontal synchronizing signal HS is lost due to a dropout or other causes. Therefore, the RS flip-flop produces a signal NT shown in FIG. 14(f) from the output terminal Q.

This signal NT is a signal indicating the line with the last horizontal synchronizing signal as will be seen from FIG. 14(f). In other words, since the horizontal synchronizing signal HS (or burst signal BST) is lost, the line indicated by this signal cannot be corrected for the timebase variation.

As described above, when the timebase variation correction is not correctly made, the video signal in this line appears shifted in the horizontal direction on the screen, or the reproduced picture is deteriorated in its quality. According to this invention, to reduce the picture quality deterioration, the write enable signals WE1 and WE2 (broken line in FIG. 14(c)) are forcibly turned to "L" level, preventing the field memories from writing, and the line which cannot be corrected in its timebase variation as indicated by the signal NT can be replaced by the two-field-before part of the video signal, in addition to the compensation for the dropout period. More specifically, the signal NT (FIG. 14(f)) from the RS flip-flop and the dropout signal DOP (FIG. 14(b)) from the terminal 603 are logically added by an OR circuit 605 to produce a signal DOP' (FIG. 14(g)) which is used as a new dropout signal. The same revised dropout signal DOP' can be produced from an RS flip-flop which is set by the leading edge of the dropout signal and reset by the initially correctly separated horizontal synchronizing signal HS. This revised dropout signal DOP' thus generated is used in place of the dropout signal DOP and supplied to the write control circuit 170 shown in FIGS. 1 and 8, thereby realizing the above operation.

Figure 4:
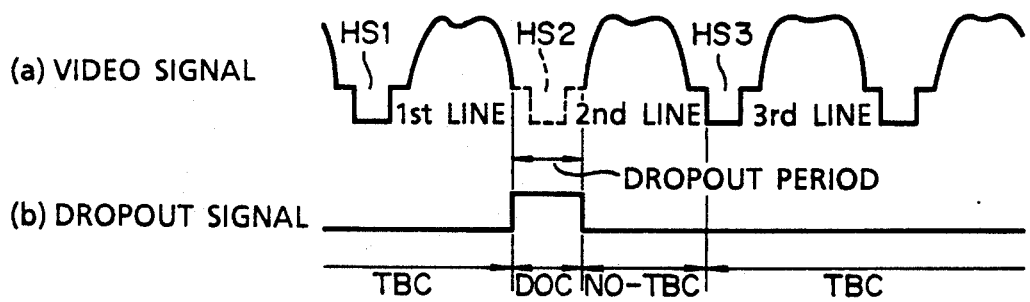
Figure 5:
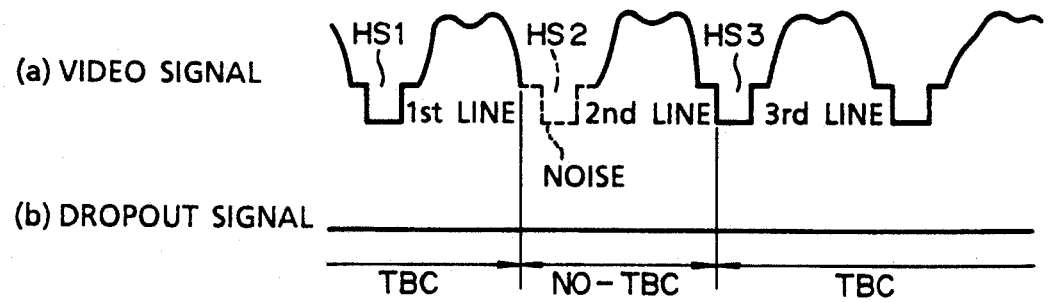

Therefore, as shown in FIGS. 4 and 5, even if such lines occur from which the horizontal synchronizing signal HS (or burst signal BST) as the reference for the timebase variation correction cannot be correctly separated to correct the timebase variation precisely, these lines are replaced by the two-field-before part of the video signal by use of the signal DOP' as described above, so that the reproduced picture quality deterioration can be reduced.

Figure 16:
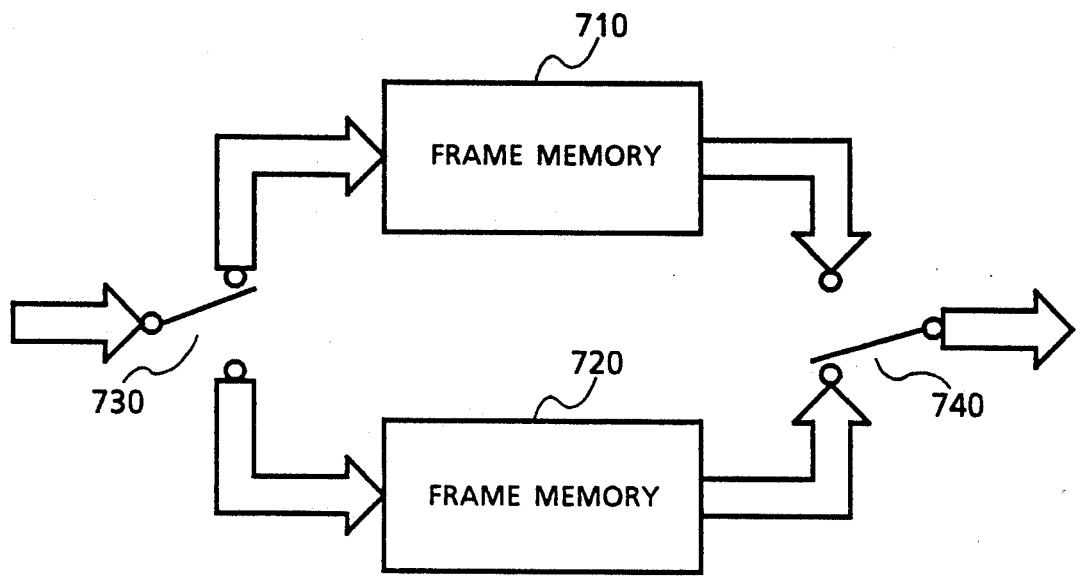
FIGS. 16, 18 and 20 are block diagrams of other memory systems of the invention.
Figure 17:
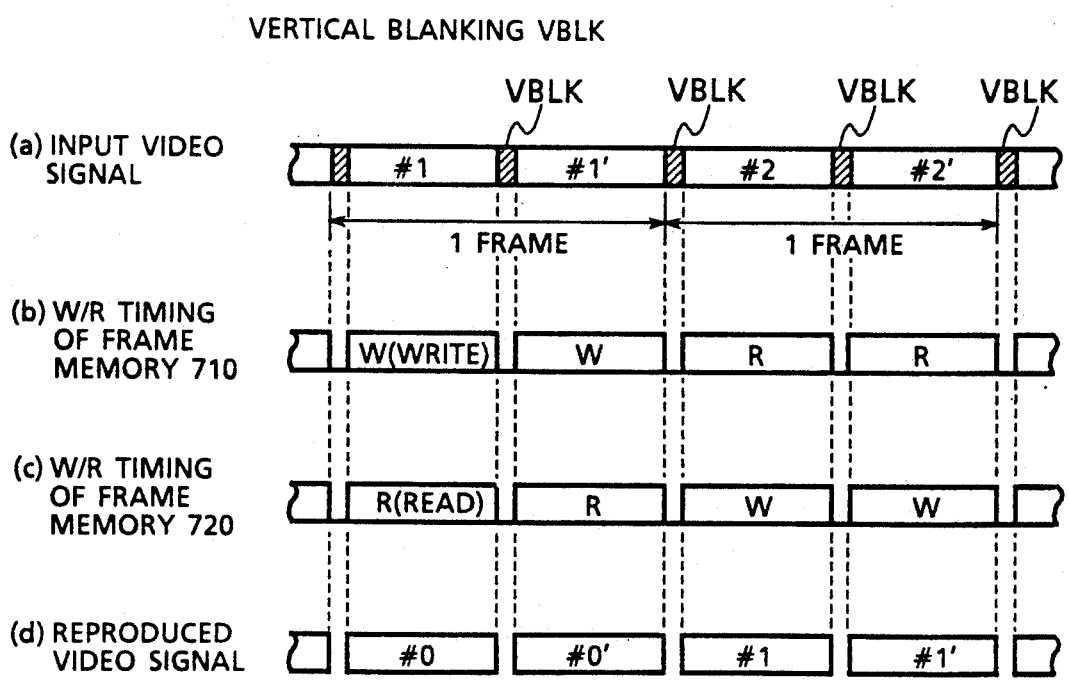
FIG. 17 is a waveform diagram to which reference is made in explaining the operation of the memory system of FIG. 16.

In this embodiment of the invention, as described above, the memory system is formed of two field memories 120 and 130 as shown in FIG. 1, which repeat the writing and reading operations alternately at every field so as to make the timebase variation correction and the dropout compensation. This invention is not limited to the above. For example, as shown in FIG. 16, two frame memories 710 and 720 are used to form the memory system, and the input video signal (FIG. 17(a)) is written therein and read as the reproduced video signal (FIG. 17(d)) therefrom alternately at every frame through switching circuits 730 and 740 at the timing shown in FIGS. 17(a) and 17(c), so that similarly the timebase variation correction and the dropout compensation (replacement by the two-frame-before part of the video signal) can be made, which fact does not depart from the scope of this invention.

Figure 18:
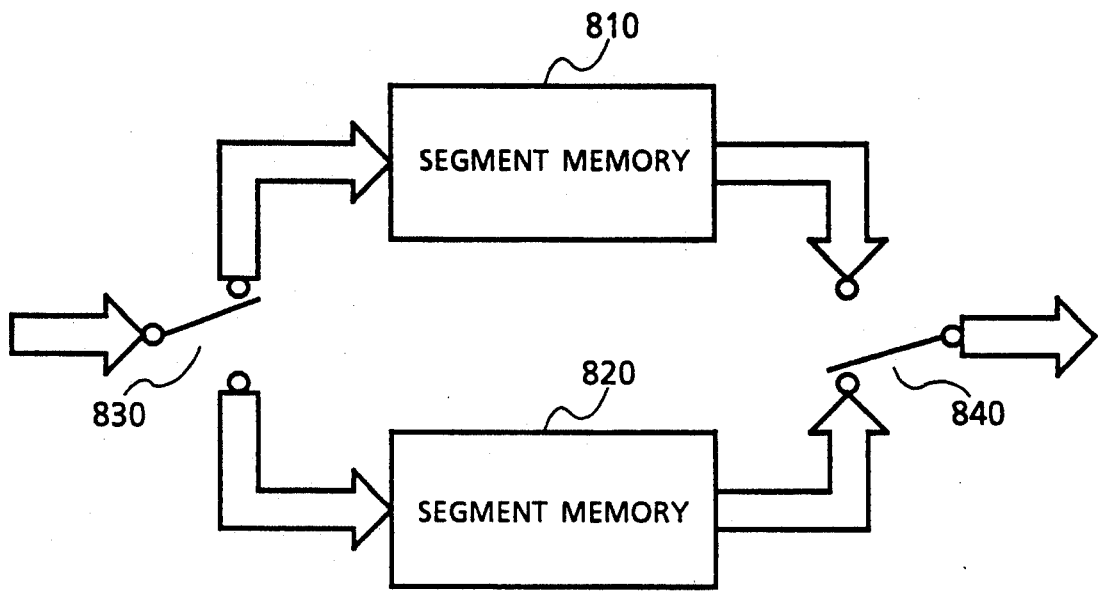
Figure 19:
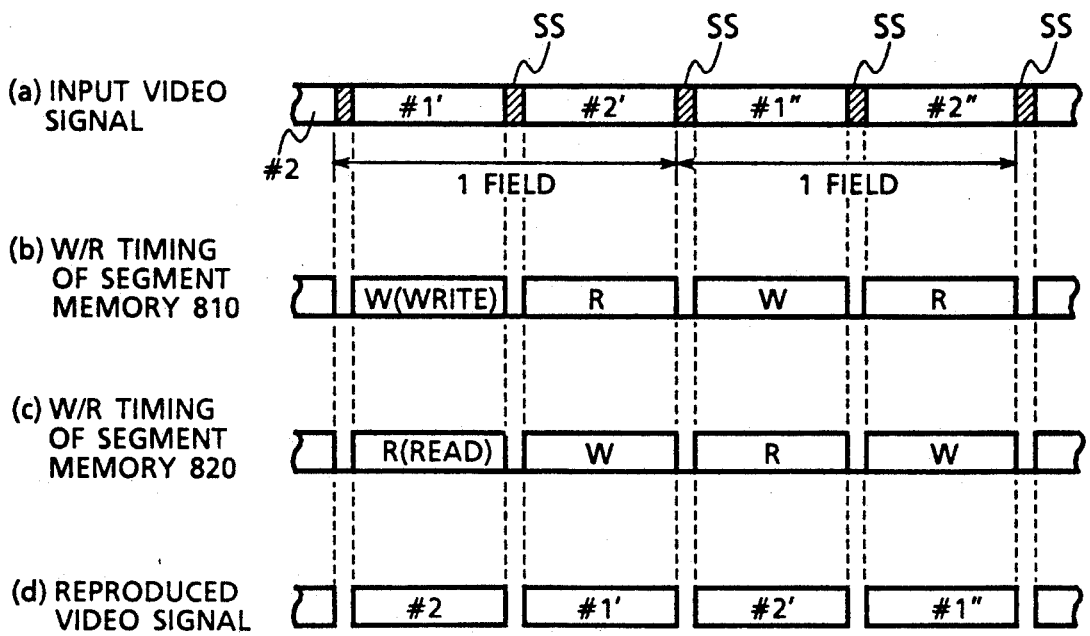
FIG. 19 is a waveform diagram to which reference is made in explaining the operation of the memory system of FIG. 18.
Figure 20:
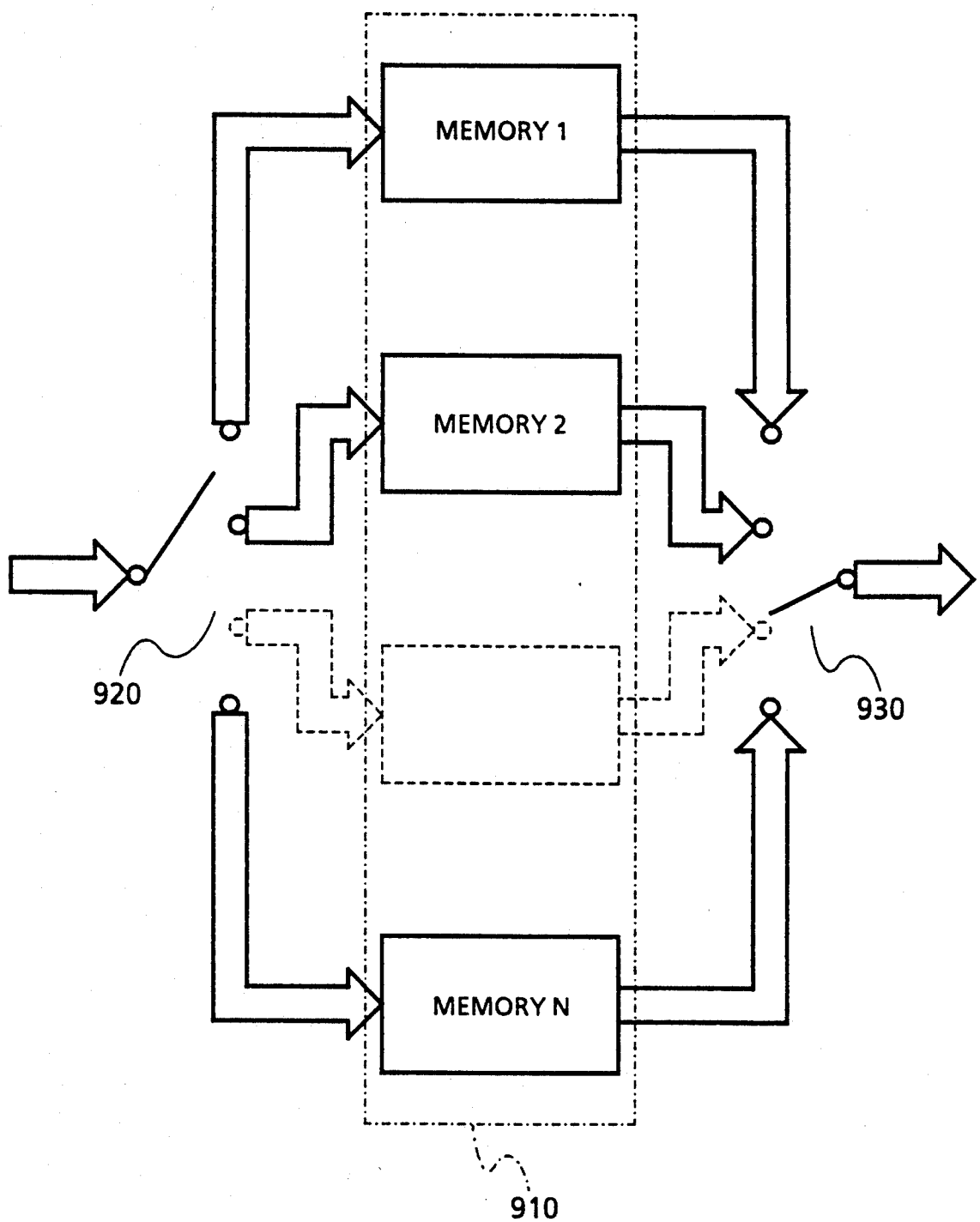

Moreover, in the segment recording system VTR in which each field of a video signal is divided into segments which are recorded on a plurality of tracks, when the video signal is recorded or reproduced in the recorded signal format in which a segment synchronizing signal is inserted in the beginning portion of each segment in place of the vertical synchronizing signal, the above-given memory system is formed of a plurality of segment memories, for example, two segment memories 810 and 820 (having a capacity of one-segment image information data) as shown in FIG. 18, and the input video signal (FIG. 19(a)) is written therein and read as the reproduced video signal (FIG. 19(d)) therefrom at every segment through switching circuits 830 and 840 at the timing shown in FIGS. 19(b) and 19(c). In this case, similarly the timebase variation correction and the dropout compensation in which the lost part of a segment is replaced by one-field-before part of the same segment of the video signal can be performed, and which fact does not depart from the scope of the invention. The number of segments is not limited to two as shown in FIG. 19, but may be arbitrary.

While in the above embodiments two memories are switched at every field, at every frame or at every segment, N memories 910 may be provided and cyclically switched at every field, at every frame or at every segment by switching circuits 920 in turn so that the input video signal is written therein and read as the reproduced video signal therefrom. In this case, similarly the timebase variation correction and the dropout compensation can be performed without departing from the scope of the invention.

According to this invention, as described above, the compensation of the timebase variation included in the video signal and the dropout compensation can be performed in the same memory system at a time. Thus, the circuit scale can be reduced, the signal processing can be simplified, and the apparatus can be produced at low cost.

Furthermore, even when the synchronizing information (the horizontal synchronizing signal or burst signal) as the reference for the timebase variation correction is lost due to a dropout so that the timebase correction cannot be surely performed, the apparatus can be stably operated and the quality deterioration of the reproduced picture can be reduced.

We claim:

1. A video signal processing method for use in a magnetic recording and reproducing apparatus for writing image information from an input video signal including image information and synchronizing information in video signal processing memories and reading image information from said video signal processing memories, said method comprising the steps of:

separating said synchronizing information from said input video signal;

generating a first clock having a frequency synchronized with said input video signal on the basis of said separated synchronizing information;

detecting a dropout in said input video signal and generating a dropout detection signal corresponding to a portion of said input video signal at which said dropout occurs;

generating a write disable signal for said video signal processing memories on the basis of said dropout detection signal;

correcting a portion of said separated synchronizing information corresponding to said portion of said input video signal at which said dropout occurs on the basis of said separated synchronizing information, thereby generating corrected synchronizing information;

generating a write address signal for said video signal processing memories on the basis of said first clock and said corrected synchronized information;

writing image information from said input video signal at an address specified by said write address signal in said video signal processing memories when a write disable signal is not being generated; and leaving unchanged image information from said input video signal previously written at said address specified by said write address signal in said video signal processing memories when said write disable signal is being generated;

wherein said step of generating a write disable signal includes generating said write disable signal as long as said dropout detection signal is being generated and until a next occurrence of said separated synchronizing information.

2. A video signal processing method according to claim 1, further comprising the steps of:

generating a second clock having a predetermined frequency;

generating a read address signal on the basis of said second clock;

generating synchronizing information including a horizontal synchronizing signal and a vertical synchronizing signal on the basis of said second clock;

reading image information from an address specified by said read address signal in said video signal processing memories; and inserting said generated synchronizing information in said read image information.

3. A video signal processing apparatus for use in a magnetic recording and reproducing apparatus for writing image information from an input video signal including synchronizing information and image information in image information memories and reading image information from said image information memories, said apparatus comprising:

a synchronizing information separation circuit for separating said synchronizing information from said input video signal;

a first clock generating circuit for generating a first clock having a frequency synchronized with said input video signal on the basis of said separated synchronizing information;

a dropout detecting circuit for detecting a dropout in said input video signal and generating a dropout detection signal during a period in which said dropout occurs;

a synchronizing information correcting circuit for correcting a portion of said separated synchronizing information corresponding to said portion of said input video signal at which said dropout occurs on the basis of said separated synchronizing information, thereby generating corrected synchronizing information;

a write control circuit for generating a write address signal during a period including said period during which said dropout occurs on the basis of said first clock and said corrected synchronizing information, and generating a write disable signal on the basis of said dropout detection signal; and image information memories in which image information from said input video signal is written at an address specified by said write address signal when said write disable signal is not being generated, and in which image information from said input video signal previously written at said address specified by said write address signal is left unchanged when said write disable signal is being generated;

wherein said write control circuit generates said write disable signal as long as said dropout detection signal is being generated and until a next occurrence of said separated synchronizing information.

4. A video signal processing apparatus according to claim 3, further comprising:

a second clock generating circuit for generating a second clock having a predetermined frequency;

a read control circuit for generating a read address signal on the basis of said second clock;

a synchronizing signal generating circuit for generating reference horizontal synchronizing information and reference vertical synchronizing information on the basis of said second clock and generating composite synchronizing information including said reference horizontal synchronizing information and said reference vertical synchronizing information; and an inserting circuit for inserting said composite synchronizing information in image information read from an address specified by said read address signal in said image information memories.

5. A method of processing a video signal comprising the steps of:

receiving an input video signal including image information and synchronizing information, the input video signal being subject to timebase disturbances and dropouts;

detecting dropouts occurring in the input video signal and generating a dropout detection signal during periods of time in which the dropouts occur;

separating the synchronizing information from the input video signal;

generating a write clock having a frequency synchronized with the separated synchronizing information based on the separated synchronizing information, the write clock thus being subject to timebase disturbances occurring in the input video signal;

generating replacement synchronizing information based on the write clock and the separated synchronizing information to replace synchronizing information missing from the input video signal due to dropouts occurring in the input video signal;

generating corrected synchronizing information by adding the replacement synchronizing information to the separated synchronizing information;

generating a write address signal for a memory based on the write clock and the corrected synchronizing information;

generating a write disable signal for the memory based on the dropout detection signal;

writing current image information from the input video signal in the memory at addresses specified by the write address signal when the write disable signal is not being generated; and leaving unchanged previous image information from the input video signal which was previously written in the memory at address specified by the write address signal when the write disable signal is being generated, thereby substituting the previous image information for the current image information to compensate for dropouts occurring in the input video signal;

wherein the separated synchronizing information includes periodically occurring synchronizing information, and wherein the step of generating a write disable signal includes generating the write disable signal as long as the dropout detection signal is being generated and until a next occurrence of the periodically occurring synchronizing information.

6. A video signal processing method according to claim 5, wherein the step of generating a write disable signal includes generating the write disable signal based on the dropout detection signal, the corrected synchronizing information, and the write address signal.

7. A video signal processing method according to claim 5, further comprising the steps of:

generating a reference clock having a predetermined frequency, the reference clock thus not being subject to timebase disturbances occurring in the input video signal;

generating reference synchronizing information based on the reference clock;

generating a read address signal for the memory based on the reference clock and the reference synchronizing information;

reading image information from the memory at addresses specified by the read address signal, the image information read from the memory thus not being subject to timebase disturbances occurring in the input video signal; and generating an output video signal by combining the image information read from the memory with the reference synchronizing information.

8. An apparatus for processing a video signal comprising:

means for receiving an input video signal including image information and synchronizing information, the input video signal being subject to timebase disturbances and dropouts;

means for detecting dropouts occurring in the input video signal and generating a dropout detection signal during periods of time in which the dropouts occur;

means for separating the synchronizing information from the input video signal;

means for generating a write clock having a frequency synchronized with the separated synchronizing information based on the separated synchronizing information, the write clock thus being subject to timebase disturbances occurring in the input video signal;

means for generating replacement synchronizing information based on the write clock and the separated synchronizing information to replace synchronizing information missing from the input video signal due to dropouts occurring in the input video signal;

means for generating corrected synchronizing information by adding the replacement synchronizing information to the separated synchronizing information;

a memory;

means for generating a write address signal for the memory based on the write clock and the corrected synchronizing information;

means for generating a write disable signal for the memory based on the dropout detection signal;

means for writing current image information from the input video signal in the memory at addresses specified by the write address signal when the write disable signal is not being generated; and means for leaving unchanged previous image information from the input video signal which was previously written in the memory at addresses specified by the write address signal when the write disable signal is being generated, thereby substituting the previous image information for the current image information to compensate for dropouts occurring in the input video signal;

wherein the separated synchronizing information includes periodically occurring synchronizing information, and wherein the means for generating a write disable signal includes means for generating the write disable signal as long as the dropout detection signal is being generated and until a next occurrence of the periodically occurring synchronizing information.

9. A video signal processing apparatus according to claim 8, wherein the means for generating a write disable signal includes means for generating the write disable signal based on the dropout detection signal, the corrected synchronizing information, and the write address signal.

10. A video signal processing apparatus according to claim 8, further comprising:

means for generating a reference clock having a predetermined frequency, the reference clock thus not being subject to timebase disturbances occurring in the input video signal;

means for generating reference synchronizing information based on the reference clock;

means for generating a read address signal for the memory based on the reference clock and the reference synchronizing information;

means form reading image information from the memory at addresses specified by the read address signal, the image information read from the memory thus not being subject to timebase disturbances occurring in the input video signal; and means for generating an output video signal by combining the image information read from the memory with the reference synchronizing information.

* * * * *